(12) United States Patent
Liu et al.

(10) Patent No.: US 8,626,903 B2
(45) Date of Patent: Jan. 7, 2014

(54) METHOD AND DEVICE FOR IDENTIFYING AN SCTP PACKET

(75) Inventors: Hua Liu, Shenzhen (CN); Weijun Zhou, Shenzhen (CN); Liang Duan, Shenzhen (CN); Nengyi Pan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 108 days.

(21) Appl. No.: 12/981,182

(22) Filed: Dec. 29, 2010

(65) Prior Publication Data

US 2011/0296007 A1 Dec. 1, 2011

(30) Foreign Application Priority Data

Jun. 1, 2010 (CN) .......................... 2010 1 0193624

(51) Int. Cl.
*H04J 3/16* (2006.01)
(52) U.S. Cl.
USPC ............ 709/224; 709/230; 709/231; 709/232
(58) Field of Classification Search
USPC .................. 709/224–228, 200, 230–233, 245; 370/231, 328, 389, 235, 252, 474, 242, 370/395.5
See application file for complete search history.

(56) References Cited

U.S. PATENT DOCUMENTS

| | | | | |
|---|---|---|---|---|
| 7,277,954 B1* | 10/2007 | Stewart et al. | ................ | 709/230 |
| 7,366,096 B2* | 4/2008 | Swami | .......................... | 370/231 |
| 7,519,724 B2* | 4/2009 | Venkatsubra et al. | ........ | 709/231 |
| 7,761,562 B1* | 7/2010 | Stewart et al. | ................ | 709/224 |
| 2005/0094637 A1* | 5/2005 | Umesawa et al. | ............. | 370/389 |
| 2005/0157726 A1* | 7/2005 | Vesterinen | ................ | 370/395.5 |

(Continued)

FOREIGN PATENT DOCUMENTS

| | | |
|---|---|---|
| CN | 101094240 A | 12/2007 |
| WO | WO03/105438 A1 | 12/2003 |
| WO | WO2007/067693 A2 | 6/2007 |

OTHER PUBLICATIONS

First Chinese Office Action dated (mailed) Jul. 1, 2011, issued in related Chinese Application No. 200910148423.7 Huawei Technologies Co., Ltd.

(Continued)

*Primary Examiner* — Robert Wilson
*Assistant Examiner* — Sai Aung

(57) ABSTRACT

A method for identifying a Stream Control Transmission Protocol (SCTP) packet is provided, which includes: acquiring a feature tuple of a received SCTP packet, in which the feature tuple includes at least one piece of the following information: a source Internet Protocol (IP) address, a destination IP address, and a verification tag (V_tag); matching the acquired feature tuple of the SCTP packet with a SCTP tuple identification table, in which the SCTP tuple identification table includes a mapping relation between a feature set tuple and an SCTP association, and the feature set tuple includes at least one piece of the following information: a source IP address set, a destination IP address set, and the V_tag; and acquiring an SCTP association to which the SCTP packet belongs, if the acquired feature tuple of the SCTP packet matches one or more records of the SCTP tuple identification table. Correspondingly, a device for identifying an SCTP packet, a system for identifying an SCTP packet, and a method for establishing an SCTP tuple identification table are further provided, capable of reducing missed identification of an SCTP stream.

12 Claims, 10 Drawing Sheets

(56) References Cited

U.S. PATENT DOCUMENTS

2006/0062203 A1    3/2006  Satapati
2006/0176904 A1*   8/2006  Stewart et al. ............... 370/467
2006/0221840 A1*  10/2006  Yasuoka et al. ............. 370/242
2007/0105549 A1*   5/2007  Suda et al. ................ 455/426.2
2011/0296007 A1*  12/2011  Liu et al. ...................... 709/224

OTHER PUBLICATIONS

Extended European Search Report dated (mailed) Apr. 4, 2011, issued in related Application No. 10196848.5-1244, Hauwei Technologies Co., Ltd.

* cited by examiner

| Verification tag from a source end to a destination end | Source port | Application identifier | Source IP list | Verification tag from the destination end to the source end | Destination port | Destination IP list |
|---|---|---|---|---|---|---|
| 1254932544 | 5454 | HTTP | | 8941172325 | 78754 | |
| ..... | ..... | ..... | ..... | ..... | ..... | ..... |
| 1226480064 | 6549 | HTTP | | 1249548111 | 1567 | |
| ..... | ..... | P2P | ..... | ..... | ..... | ..... |
| ..... | ..... | ..... | ..... | ..... | ..... | ..... |
| ..... | ..... | P2P | ..... | ..... | ..... | ..... |
| ..... | ..... | ..... | ..... | ..... | ..... | ..... |

FIG. 12

METHOD AND DEVICE FOR IDENTIFYING AN SCTP PACKET

CROSS-REFERENCE TO RELATED APPLICATION

This application claims priority to Chinese Patent Application No. 201010193624.1, filed on Jun. 1, 2010, which is hereby incorporated by reference in its entirety.

FIELD OF THE INVENTION

The present invention relates to the field of communications technology, and in particular, to a method and device for identifying a Stream Control Transmission Protocol (SCTP) packet.

BACKGROUND OF THE INVENTION

SCTP is a reliable universal transmission layer protocol used on an Internet Protocol (IP) network. The protocol is initially designed for sending telecommunication signaling, has such characteristics as supporting multi-homing, multi-streaming, initialization protection, message framing, configurable unordered sending, and smooth shutdown, and the protocol has very high reliability and security. Therefore, many mainstream operating systems (such as Linux, BSD, and Solaris) begin to support the SCTP, so that currently services transmitted by using the protocol on a network are gradually increased.

In the prior art, a quintuple (a source IP, a destination IP, a source Port, a destination Port, and a transmission layer protocol) is used to identify one Transmission Control Protocol (TCP)/User Datagram Protocol (UDP) packet. Information saved in a data stream is associated with the quintuple, and a subsequent packet of the data stream uses the quintuple to index the information saved in the data stream.

However, because of a characteristic that the SCTP supports the multi-homing, i.e. the same association of the SCTP may use several different quintuples for interaction. Because a plurality of quintuples exists in the association, if the quintuple that is used for identifying the TCP/UDP packet is used to identify an SCTP association, only one or few quintuples involved in the association can be identified, a packet using other quintuples involved in the association for communication is not identified, thereby causing a large quantity of missed identification.

SUMMARY OF THE INVENTION

The embodiments of the present invention provide a method and device for identifying an SCTP packet, so as to reduce missed identification of an SCTP stream.

An embodiment of the present invention provides a method for identifying an SCTP packet, where the method includes:

acquiring a feature tuple of a received SCTP packet, in which the feature tuple includes at least one piece of the following information: a source IP address, a destination IP address, and a verification tag (V_tag);

matching the acquired feature tuple of the SCTP packet with a SCTP tuple identification table, in which the SCTP tuple identification table includes a mapping relation between a feature set tuple and an SCTP association, and the feature set tuple includes at least one piece of the following information: a source IP address set, a destination IP address set, and a V_tag; and acquiring an SCTP association to which the SCTP packet belongs, if the acquired feature tuple of the SCTP packet matches one or more records of the SCTP tuple identification table.

An embodiment of the present invention provides a device for identifying an SCTP packet, where the device includes:

a first acquiring module, configured to acquire a feature tuple of a received SCTP packet, in which the feature tuple includes at least one piece of the following information: a source IP address, a destination IP address, and a V_tag;

a matching module, configured to match the acquired feature tuple of the SCTP packet with a SCTP tuple identification table, in which the SCTP tuple identification table includes a mapping relation between a feature set tuple and an SCTP association, and the feature set tuple includes at least one piece of the following information: a source IP address set, a destination IP address set, a source port number, a destination port number, and a V_tag; and a second acquiring module, configured to acquire an SCTP association to which the SCTP packet belongs, if the acquired feature tuple of the SCTP packet matches one or more records of the SCTP tuple identification table by the matching module.

An embodiment of the present invention provides a method for establishing an SCTP tuple identification table, where the method includes:

acquiring an SCTP handshake message on an SCTP association, in which the SCTP handshake message includes an initialization (INIT) packet and an initialization acknowledgement (INIT ACK) packet that corresponds to the INIT packet;

acquiring an SCTP feature set tuple of the SCTP association from a pair of the INIT packet and the INIT ACK packet, in which the SCTP feature set tuple includes at least one piece of the following information: a source IP address set, a destination IP address set, a source port number, a destination port number, and a V_tag; and establishing a mapping relation between the feature set tuple and the SCTP association.

According to the embodiments of the present invention, for a characteristic that the SCTP supports multi-homing, the SCTP tuple identification table including the mapping relation between the feature set tuple of the SCTP packet and the SCTP association is used to identify the SCTP packet. Because the SCTP feature set tuple includes the source IP address set, the destination IP address set, and the V_tag, the SCTP feature set tuple includes all interaction in one SCTP association. If the feature tuple of the SCTP packet such as the source IP address, the destination IP address, or the SCTP tag matches the feature set tuple successfully, the SCTP association to which the SCTP packet belongs can be acquired. As compared with the prior art in which all interaction in the same association cannot be completely identified when a conventional quintuple is used to identify an SCTP data stream, after a quintuple used in the SCTP association has switched, the solution in this embodiment is still capable of correctly identifying an SCTP association to which a packet of the interaction belongs according to a matching result of the IP address set or the V_tag, so as to reduce missed identification.

BRIEF DESCRIPTION OF THE DRAWINGS

To make the technical solution under the present invention clearer, the accompanying drawings for illustrating the embodiments of the present invention or the prior art are outlined below. Apparently, the accompanying drawings are

FIG. 12 is a schematic structural view of an SCTP tuple identification table according to an embodiment of the present invention.

DETAILED DESCRIPTION OF THE EMBODIMENTS

The following detailed description is directed to the technical solution of the present invention with reference to the accompanying drawings. However, the embodiments to be described are only part of, rather than all of, the embodiments of the present invention. Those skilled in the art can derive other embodiments from the embodiments given herein without creative work, and all such embodiments are covered in the scope of protection of the present invention.

Figure 1:
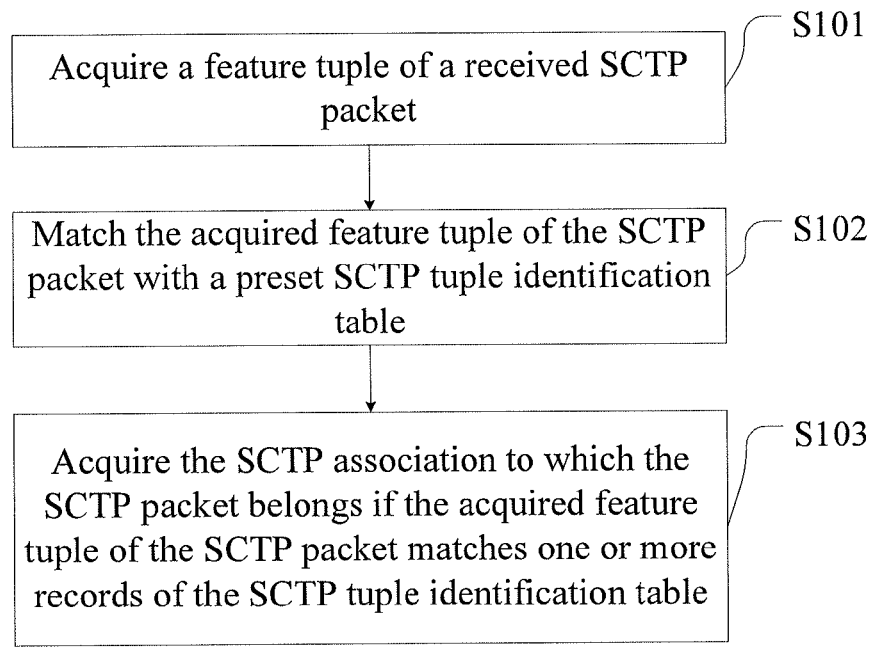
FIG. 1 is a flow chart of a method for identifying an SCTP packet according to an embodiment of the present invention.

As shown in FIG. 1, an embodiment of the present invention provides a method for identifying an SCTP packet, which includes the following steps:

Step S101: Acquire a feature tuple of a received SCTP packet.

In one embodiment, the feature tuple of the SCTP packet includes at least one piece of the following information in the SCTP packet: a source IP address, a destination IP address, and a V_tag. In another embodiment, the feature tuple of the SCTP packet can further include a source port number or a destination port number. In another embodiment, the feature tuple of the SCTP packet can further include the source port number and the destination port number.

In one embodiment, if the SCTP packet is sent from a source end to a destination end, the V_tag is a V_tag from the source end to the destination end.

In one embodiment, if the SCTP packet is sent from the destination end to the source end, the V_tag is a V_tag from the destination end to the source end.

Step S102: Match the acquired feature tuple of the SCTP packet with a preset SCTP tuple identification table. The SCTP tuple identification table includes a mapping relation between a feature set tuple of the SCTP packet and an SCTP association.

It is noted that, in one embodiment, the SCTP tuple identification table can further include an association relation, and the association relation is used to point to records of feature set tuples belonging to the same association.

It is noted that, in one embodiment, in the SCTP tuple identification table, the SCTP association is identified with an association identifier or an application identifier, in which the association identifier is used to identify a sequence number of the SCTP association, and the application identifier is used to identify an application type borne by the SCTP association.

In one embodiment, the feature set tuple in the SCTP tuple identification table includes at least one piece of the following information: a source IP address set, a destination IP address set, and the V_tag. In another embodiment, the feature set tuple can further include the source port number and the destination port number.

It is noted that, in this embodiment and other embodiments of the present invention, the source IP address set includes all IP addresses available to the source end in the SCTP association, and the destination IP address set includes all IP addresses available to the destination end in the SCTP association. A V_tag is special for establishing an association, endpoints at two sides of the SCTP exchange V_tags at the time of establishing the association, and a value of the V_tag is determined during a first time of exchange at the time of SCTP handshake and remains unchanged during subsequent interaction.

In one embodiment, during matching, the acquired feature tuple can be used as a key value, and matches the SCTP tuple identification table using a hash lookup method. As one specific lookup manner, the hash lookup method has a quick lookup advantage, and is capable of increasing a matching speed. It can be understood that, the hash lookup method is not a unique implementation manner for matching, so that the hash lookup manner as one example should not be understood as a limitation to the embodiment of the present invention.

Figure 4:
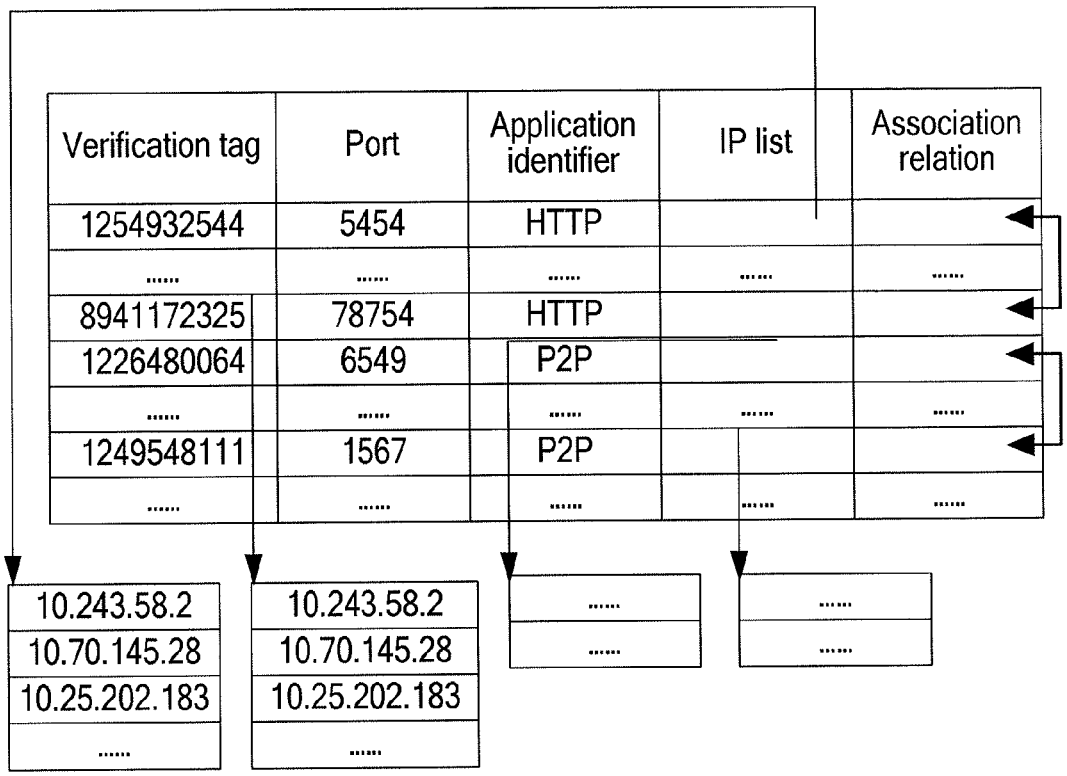
FIG. 4 is a schematic structural view of an SCTP tuple identification table according to an embodiment of the present invention.

FIG. 4 is a schematic structural view of an SCTP tuple identification table according to an embodiment of the present invention. According to FIG. 4, the SCTP tuple identification table includes a V_tag, a port, an application identifier (Application), an IP list, and an association relation (Relation). In the embodiment of the present invention, each SCTP tuple identification table entry in the SCTP tuple identification table is referred to as one record. As shown in FIG. 4, each entry (record) of the SCTP table includes a V_tag, a port, an application identifier, an IP list, and an association relation. In FIG. 4, the V_tag is used to identify an SCTP packet. The IP list identifies one IP address set through one pointer, and the IP address set can be a source IP address set or a destination IP address set.

In this embodiment, in the SCTP tuple identification table as shown in FIG. 4, a mapping relation between a feature set tuple of the SCTP packet and an SCTP association is denoted through the association relation. In Table 4, the association relation is used to associate records of feature set tuples belonging to the same association. In other words, the association relation associates two records, and identifies that the two records belong to the same SCTP association.

In FIG. 4, according to this embodiment, one SCTP association is identified with an application identifier, and an application type borne by the association is capable of being acquired through the application identifier. Definitely, in another embodiment, the SCTP association can also be identified by an association identifier instead of the application identifier, and a sequence number of the SCTP association is capable of being acquired through the association identifier. At this time, in one embodiment, an information entry of one application identifier can be further added, so as to identify an application borne by the SCTP association.

Definitely, in another embodiment, an IP address set can also, be directly placed in an IP list item without using a pointer. In another embodiment, two records having an association relation can be further merged into one record, as shown in FIG. 12. In FIG. 12, each record of the SCTP tuple identification table includes a source IP address set, a destination IP address set, a source port number, a destination port number, and a V_tag (for FIG. 12, in one embodiment, which can also be called a V_tag pair, that is, a V_tag from a source end to a destination end and a V_tag from a destination end to a source end in FIG. 12). In FIG. 12, each record represents one association. FIG. 4 and FIG. 12 are only used as examples of one SCTP tuple identification table according to the embodiment of the present invention, and the embodiment of the present invention does not impose a special limitation on the SCTP tuple identification table.

In one embodiment, the V_tag is a V_tag from the source end to the destination end and/or from the destination end to the source end. For example, when a structure of the SCTP tuple identification table as shown in FIG. 4 is adopted, a V_tag of one record in the table can be the V_tag from the source end to the destination end, and can also be the V_tag from the destination end to the source end. When a structure of the SCTP tuple identification table as described in FIG. 12 is adopted, a V_tag of one record in the table is the V_tag from the source end to the destination end and the V_tag from the destination end to the source end.

To more visually illustrate an association relation of two records, in FIG. 4, records belonging to the same SCTP association are connected and shown with arrows. As shown in FIG. 4, an SCTP packet with a V_tag of 1254932544 and an SCTP packet with a V_tag of 8941172325 belong to the same SCTP association. An IP list in a record that corresponds to the SCTP packet with the V_tag of 1254932544 identifies a source IP address set through one pointer, and an IP list in a record that corresponds to the SCTP packet with the V_tag of 8941172325 identifies a destination IP address set through one pointer.

When a new SCTP packet is received, a feature tuple of the SCTP packet can be acquired by parsing the SCTP packet. For example, in one embodiment, by parsing the received new SCTP packet, a source IP address of the SCTP packet is acquired to be 10.70.145.28. At this time, the acquired source IP address can be matched with the SCTP tuple identification table in FIG. 4, to obtain an SCTP association to which the SCTP packet belongs.

Step S103: Acquire the SCTP association to which the SCTP packet belongs if the acquired feature tuple of the SCTP packet matches one or more records of the preset SCTP tuple identification table.

In one embodiment, if the feature tuple of the SCTP packet matches the SCTP tuple identification table successfully, it indicates that the SCTP packet belongs to an existing SCTP association in the SCTP tuple identification table, so that the SCTP association to which the SCTP packet belongs can be acquired through a mapping relation between the feature set tuple of the SCTP packet and the SCTP association in the SCTP tuple identification table, that is, an SCTP data stream to which the SCTP packet belongs is acquired. Further, an application borne by the SCTP association to which the SCTP packet belongs can be further acquired through an application identifier in the SCTP tuple identification table. One SCTP association corresponds to one application, so that after an association to which one SCTP packet belongs is identified according to the method in this embodiment, subsequent packets belonging to the SCTP association bear the same application.

For example, in one embodiment, an IP address of the SCTP packet with the IP address of 10.70.145.28 matches the SCTP tuple identification table in FIG. 4, a record that corresponds to the SCTP packet and a record having an association relation with the SCTP packet can be acquired (in FIG. 4, the record corresponding to the SCTP packet with the V_tag of 8941172325), so as to determine an SCTP association to which the SCTP packet belongs. Further, an application borne by the association to which the SCTP belongs is acquired through the application identifier, and subsequently, if other packets belonging to the SCTP association are identified, it is directly known that the packets bear an HTTP application.

For example, according to FIG. 4, an application borne by the SCTP association to which the SCTP packet with the IP address of 10.70.145.28 belongs is an HTTP application. In one embodiment, after a packet with an IP address of 10.25.202.183 is matched, it is found that a record corresponding to the packet and the record corresponding to the SCTP packet with the IP address of 10.70.145.28 have an association relation and belong to the same SCTP association, and a corresponding application is an HTTP application.

It is noted that, FIG. 4 is only an example of one tuple identification table according to the embodiment of the present invention. The SCTP tuple identification table as shown in FIG. 4 only provides a typical manner of realizing the SCTP tuple identification table, is not unique, and can be optimized and improved on the basis of the table. For example, in one embodiment, if such factors as erroneous identification, missed identification, and unnecessity of the acquisition of a corresponding application are not considered, only a V_tag and an association relation can also be used to organize the SCTP tuple identification table.

Alternatively, in another embodiment, only an IP list and an association relation can also be used to organize the SCTP tuple identification table. The SCTP tuple identification table is preset, so that at this time, a feature tuple of an SCTP packet needs to be retrieved correspondingly according to a record in the SCTP tuple identification table. For example, if the SCTP tuple identification table is set only with the V_tag and the association relation, the V_tag of the received SCTP packet needs to be retrieved; and if the SCTP tuple identification table is set only with the IP list and the association relation, the source IP address or the destination IP address of the received SCTP packet needs to be retrieved.

According to the embodiments of the present invention, through the foregoing technical solution, for a feature that the SCTP supports multi-homing, the SCTP tuple identification table including the mapping relation between the feature set tuple of the SCTP packet and the SCTP association is used to identify the SCTP packet. Because the SCTP feature set tuple includes the source IP address set, the destination IP address set, or the V_tag, the SCTP feature set tuple includes all interaction in one SCTP association. If the feature tuple of the SCTP packet such as the source IP address, the destination IP address, or the SCTP tag matches the feature set tuple successfully, the SCTP association to which the SCTP packet belongs can be acquired. As compared with the prior art in which all interaction in the same association cannot be completely identified when a conventional quintuple identifies an SCTP data stream, after a quintuple is used for switching in the SCTP association, the solution in this embodiment is still capable of correctly identifying an SCTP association to which a packet of the interaction belongs according to a matching result of the IP address set or the V_tag, so as to reduce missed identification.

Figure 2:
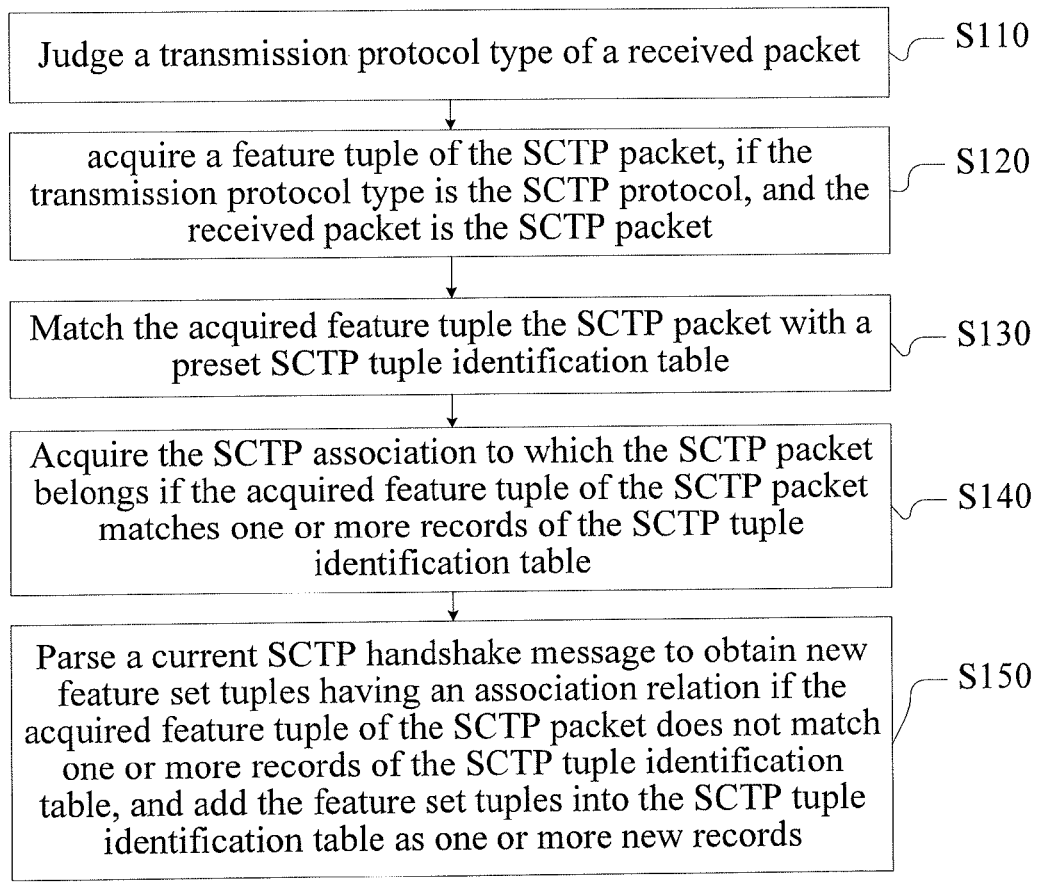
FIG. 2 is a flow chart of a method for identifying an SCTP packet according to an embodiment of the present invention.

As shown in FIG. 2, an embodiment of the present invention provides a method for identifying an SCTP packet, which includes the following steps:

Step S110: Judge a transmission protocol type of a received packet.

In one embodiment, it can be judged whether the received packet is an SCTP packet by judging a type of a transmission layer protocol of the received packet. If the type of the transmission layer protocol is a TCP/UDP protocol, the received packet is an ordinary packet, and at this time, an ordinary quintuple can be used to identify the packet. If the type of the transmission layer protocol is an SCTP protocol, the received packet is an SCTP packet.

Step S120: acquire a feature tuple of the SCTP packet, if the transmission protocol type is the SCTP protocol, and the received packet is the SCTP packet.

In one embodiment, the feature tuple of the SCTP packet includes at least one piece of the following information in the SCTP packet: a source IP address, a destination IP address, and a V_tag. In one embodiment, the feature tuple can further include the source port number and the destination port number. In one embodiment, the feature tuple can further include all the information of the source IP address, the destination IP address, the source port number, the destination port number, and the V_tag.

Step S130: Match the acquired feature tuple of the SCTP packet with a preset SCTP tuple identification table. The SCTP tuple identification table includes a mapping relation between a feature set tuple of the SCTP packet and an SCTP association.

In one embodiment, during matching, the acquired feature tuple can be used as a key value, and matches the SCTP tuple identification table with a hash lookup method. As one specific lookup manner, the hash lookup method has a quick lookup advantage, and is capable of increasing a matching speed. It can be understood that, the hash lookup method is not a unique implementation manner for matching, so that the hash lookup manner as one example should not be understood as a limitation to the embodiment of the present invention.

In one embodiment, the feature set tuple includes at least one piece of the following information: a source IP address set, a destination IP address set, a source port number, a destination port number, and a V_tag. In one embodiment, the feature set tuple can further include the source port number and the destination port number. In one embodiment, the feature set tuple can further include all the information of the source IP address set, the destination IP address set, the source port number, the destination port number, and the V_tag. A specific type of the V_tag is described in detail in the embodiment, and is not recited anymore here.

Step S140: Acquire the SCTP association to which the SCTP packet belongs if the acquired feature tuple of the SCTP packet matches one or more records of the preset SCTP tuple identification table.

In one embodiment, further, an application borne by the SCTP association to which the SCTP packet belongs can be further acquired through an application identifier in the SCTP tuple identification table.

Step S150: Parse a current SCTP handshake message to obtain new feature set tuples having an association relation if the acquired feature tuple of the SCTP packet does not match one or more records of the preset SCTP tuple identification table, and add the feature set tuples into the SCTP tuple identification table as one or more new records.

In one embodiment, if the acquired feature tuple of the SCTP packet does not match one or more records of the preset SCTP tuple identification table, it indicates that the SCTP packet is a SCTP handshake message for establishing a new connection, and belongs to one new SCTP data stream, and one or more new records needs to be added to identify the new SCTP data stream.

In one embodiment, step S150 can include the following steps:

Step S1501: Acquire an SCTP handshake message. The handshake message includes an INIT packet and an INIT ACK packet belonging to the same new SCTP association.

In one embodiment, a corresponding INIT ACK packet can be acquired through an IP list in the INIT packet, to obtain the SCTP handshake message, wherein the corresponding INIT ACK packet belongs to the same SCTP handshake message as the INIT packet. Specifically, in one embodiment, the IP list of the INIT packet can be parsed to obtain a destination IP of the INIT ACK packet. If the destination IP is located in the IP list of the INIT packet, it can be acknowledged that the INIT ACK packet and the INIT packet belong to the same SCTP association.

Step S1502: Acquire a feature tuple of the INIT packet by parsing the INIT packet in the handshake message to obtain a feature tuple of the INIT ACK packet by parsing the INIT ACK packet in the handshake message.

Step S1503: Acquire a source IP address set, a destination IP address set, a source port number, a destination port number, and a V_tag of a new SCTP association that corresponds to the current SCTP handshake message based on the feature tuples of the INIT packet and the feature tuples of the INIT ACK packet acquired by parsing.

Step S1504: Associate source end data and destination end data acquired in step S1503, to obtain a record of the new SCTP association that corresponds to the current SCTP handshake message.

Step S1505: Add the record of the new SCTP association into the SCTP tuple identification table.

In another embodiment, step S150 can include the following steps:

Step S1511: Acquire the SCTP handshake message. The handshake message includes the INIT packet and the INIT ACK packet belonging to the same new SCTP association.

Step S1512: Parse the INIT packet, and add information acquired by parsing to the SCTP tuple identification table as one record. The information acquired by parsing includes at least one piece of the following information: an IP address set, a port, and a V_tag of the INIT packet.

After the information acquired by parsing the INIT packet is added to the SCTP tuple identification table as one record, the record does not have a record with an association relation in the SCTP tuple identification table, so that step S1513 needs to be performed.

Step S1513: Parse the INIT ACK packet to obtain an IP address set, a port, and a V_tag of the packet.

Step S1514: Parse a common packet header of the SCTP packet to obtain a V_tag, and match the V_tag in the common packet header with the SCTP tuple identification table. A record whose V_tag matches the V_tag in a common packet header is a record that corresponds to the INIT packet in step S1512.

Step S1515: Add the information acquired by parsing in step S1515 to the SCTP tuple identification table as another record, and establish an association relation between the another record and the record acquired by matching in step S1514.

It can be known from the foregoing content that, in the two embodiments, the INIT packet and the INIT ACK packet included in the current SCTP handshake message can be parsed to identify the new SCTP data stream. In another embodiment of the present invention, when the one or more new records are added into the SCTP tuple identification table in step S150, it is possible that only the INIT ACK packet is parsed. The INIT ACK packet carries V_tag of a source end and a destination end and port information of a source end and a destination end. By parsing the INIT ACK packet to obtain the V_tag and the port information of the source end and the destination end, the information of the source end and the destination end obtained by the parsing is associated and is added into the SCTP tuple identification table as two records of one association.

Figure 13:
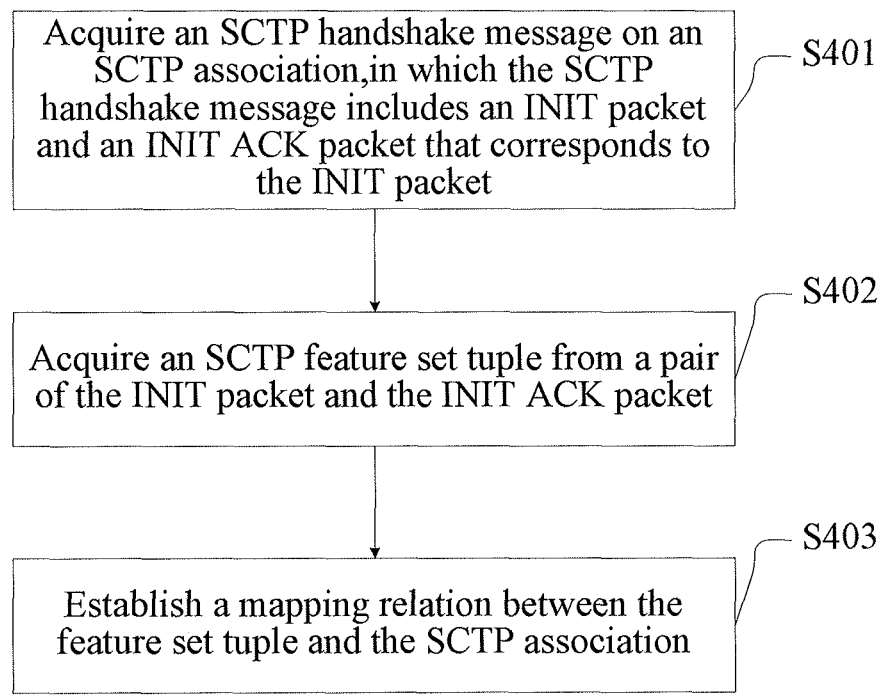
FIG. 13 is a flow chart of a method for establishing an SCTP tuple identification table according to an embodiment of the present invention.

As shown in FIG. 13, an embodiment of the present invention provides a method for establishing an SCTP tuple identification table, which includes the following steps.

Step S401: Acquire an SCTP handshake message on an SCTP association. The SCTP handshake message includes an INIT packet and an INIT ACK packet that corresponds to the INIT packet.

Step S402: Acquire an SCTP feature set tuple from a pair of the INIT packet and the INIT ACK packet. The SCTP feature set tuple includes at least one piece of the following information: a source IP address set, a destination IP address set, a source port number, a destination port number, and a V_tag.

Specifically, in one embodiment, step S402 can include the following steps.

Step S4021: Parse the INIT ACK packet to obtain a source IP address, a destination IP address, a source port number, a destination port number, and a V_tag from a source end to a destination end of the SCTP association.

Step S4022: Parse the INIT ACK packet to obtain a destination IP address, a source IP address, a source port number, a destination port number, and a V_tag from the destination end to the source end of the SCTP association.

Step S4023: according to information acquired by parsing the INIT packet and the INIT ACK, acquire the feature set tuple of the SCTP association.

Step S403: Establish a mapping relation between the feature set tuple and the SCTP association.

In one embodiment, step S403 can include the following steps.

Source end data and destination end data acquired in step S402 are associated, to obtain a record of the new SCTP association that corresponds to the current SCTP handshake message.

In one embodiment, step S403 can include the following steps.

Step S4031: Add the information acquired by parsing in step S4021 to the SCTP tuple identification table as one record.

Step S4032: Parse a common packet header of the SCTP packet on the SCTP association to obtain a V_tag, and match the V_tag in the common packet header with the SCTP tuple identification table. A record whose V_tag matches the V_tag in a common packet header is a record that corresponds to the INIT packet in step S4031.

Step S4033: Add the information acquired by parsing in step S4022 to the SCTP tuple identification table as another record, and establish an association relation between the another record and the record acquired by matching in step S4032.

According to the embodiments of the present invention, through the foregoing technical solution, for a feature that the SCTP supports multi-homing, the SCTP tuple identification table including the mapping relation between the feature set tuple of the SCTP packet and the SCTP association is used to identify the SCTP packet. Because the SCTP feature set tuple includes the source IP address set, the destination IP address set, or the V_tag, the SCTP feature set tuple includes all interaction in one SCTP association. If the feature tuple of the SCTP packet such as the source IP address, the destination IP address, or the SCTP tag matches the feature set tuple successfully, the SCTP association to which the SCTP packet belongs can be acquired. As compared with the prior art in which all interaction in the same association cannot be completely identified when a conventional quintuple identifies an SCTP data stream, after a quintuple is used for switching in the SCTP association, the solution in this embodiment is still capable of correctly identifying an SCTP association to which a packet of the interaction belongs according to a matching result of the IP address set or the V_tag, so as to reduce missed identification. Furthermore, a packet matched with the SCTP tuple identification table unsuccessfully is parsed, and a result acquired by parsing is updated as a record in the SCTP tuple identification table, thereby facilitating subsequent identification of a packet belonging to the same SCTP association.

Figure 3:
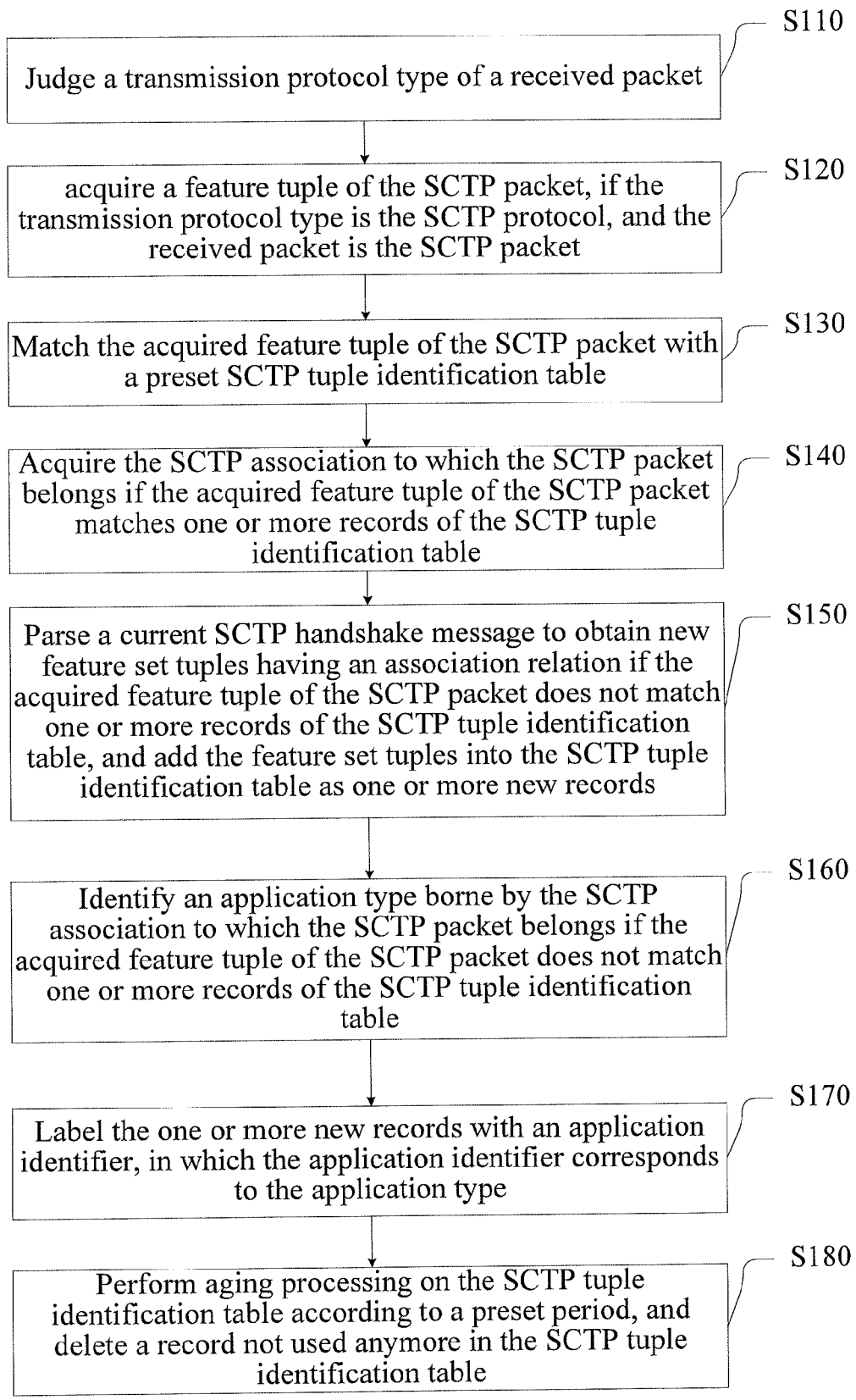
FIG. 3 is a flow chart of a method for identifying an SCTP packet according to an embodiment of the present invention.

As shown in FIG. 3, on the basis of the corresponding embodiment based on FIG. 2, an SCTP data stream identification method according to the embodiment of the present invention can further include the following steps:

Step S160: Identify an application type borne by the SCTP association to which the SCTP packet belongs if the acquired feature tuple of the SCTP packet does not match one or more records of the preset SCTP tuple identification table.

In one embodiment, a service identification technology (such as a Deep Packet Inspection (DPI) technology) can be used to identify an SCTP data stream, that is, the application type borne by the SCTP association.

Step S170: Label the one or more new records with an application identifier, in which the application identifier corresponds to the application type.

In one embodiment, the application type is associated with the corresponding association, and a corresponding record is labeled with the application identifier in the SCTP tuple identification table, so that it is convenient for a subsequent packet of the SCTP data stream to directly find a corresponding record through the SCTP tuple identification table to acquire a service type borne by the SCTP.

Step S180: Perform aging processing on the SCTP tuple identification table according to a preset period, and delete a record not used anymore in the SCTP tuple identification table.

In one embodiment, the received SCTP packet can be parsed, and if the received SCTP packet is an SCTP shutdown packet (such as SHUTDOWN, SHUTDOWN ACK, or ABORT), a corresponding record is deleted from the SCTP tuple identification table.

In one embodiment, a count recording the number of times corresponding records are matched successfully in the SCTP tuple identification table can be periodically checked, and if the count of the corresponding records is not increased, the records whose count does not increase is deleted in the SCTP tuple identification table.

In one embodiment, a timestamp recording time at which corresponding records are matched successfully in the SCTP tuple identification table can be periodically checked, and a record whose timestamp exceeds a preset aging time is deleted.

It is noted that, in one embodiment, when the SCTP tuple identification table is pre-established, the adopted method is similar to steps S1501 to S1504 or steps S1511 to S1515, and is not recited anymore here. In another embodiment, when the SCTP tuple identification table is pre-established, the method in steps S160 to S170 can be further adopted, to identify an application corresponding to one SCTP association and use a corresponding application identifier to identify the SCTP association, and is not recited anymore here.

According to the embodiments of the present invention, through the foregoing technical solution, for a feature that the SCTP supports multi-homing, the SCTP tuple identification table including the mapping relation between the feature set tuple of the SCTP packet and the SCTP association is used to identify the SCTP packet. Because the SCTP feature set tuple includes the source IP address set, the destination IP address set, or the V_tag, the SCTP feature set tuple includes all interaction in one SCTP association. If the feature tuple of the SCTP packet such as the source IP address, the destination IP address, or the SCTP tag matches the feature set tuple successfully, the SCTP association to which the SCTP packet belongs can be acquired. As compared with the prior art in which all interaction in the same association cannot be completely identified when a conventional quintuple identifies an SCTP data stream, after a quintuple is used for switching in the SCTP association, the solution in this embodiment is still capable of correctly identifying an SCTP association to which a packet of the interaction belongs according to a matching result of the IP address set or the V_tag, so as to reduce missed identification. Furthermore, a packet matched with the SCTP tuple identification table unsuccessfully is parsed, and a result acquired by parsing is updated as a record in the SCTP tuple identification table, thereby facilitating subsequent identification of a packet belonging to the same SCTP association. Further, the service identification technology identifies the application borne by the new SCTP association, thereby facilitating subsequent identification of an application borne by an SCTP packet belonging to the same SCTP association, and by aging maintaining the SCTP tuple identification table and timely deleting a record not used anymore in the SCTP tuple identification table, identification efficiency is increased.

Figure 5:
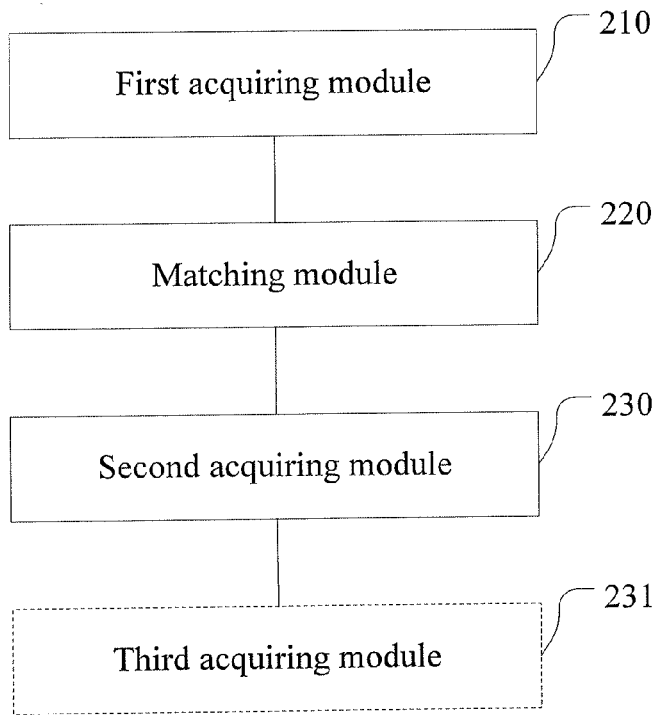
FIG. 5 is a structural view of a device for identifying an SCTP packet according to an embodiment of the present invention.

As shown in FIG. 5, an embodiment of the present invention provides a device for identifying an SCTP packet, which includes a first acquiring module 210, a matching module 220, and a second acquiring module 230.

The first acquiring module 210 is configured to acquire a feature tuple of a received SCTP packet.

In one embodiment, the feature tuple of the SCTP packet includes at least one piece of the following information in the SCTP packet: a source IP address, a destination IP address, and a V_tag. In one embodiment, the feature tuple can further include a source port number and a destination port number. In one embodiment, the feature set tuple can further include all the information of the source IP address, the destination IP address, the source port number, the destination port number, and the V_tag.

The matching module 220 is configured to match the acquired feature tuple of the SCTP packet with a preset SCTP tuple identification table. The SCTP tuple identification table includes a mapping relation between a feature set tuple of the SCTP packet and an SCTP association.

In one embodiment, the feature set tuple includes at least one piece of the following information: a source IP address set, a destination IP address set, a source port number, a destination port number, and a V_tag. In one embodiment, the feature set tuple can further include the source port number and the destination port number. In one embodiment, the feature set tuple can further include all the information of the source IP address set, the destination IP address set, the source port number, the destination port number, and the V_tag.

The second acquiring module 230 is configured to acquire an SCTP association to which the SCTP packet belongs, if the matching module 220 performs matching successfully.

In one embodiment, if the feature tuple of the SCTP packet matches the SCTP tuple identification table successfully, it indicates that the SCTP packet belongs to an existing SCTP association in the SCTP tuple identification table, so that the second acquiring module 230 can acquire the SCTP association to which the SCTP packet belongs through a mapping relation between the feature set tuple of the SCTP packet and the SCTP association in the SCTP tuple identification table, that is, an SCTP data stream to which the SCTP packet belongs is acquired.

As shown in a dashed line frame in FIG. 5, in one embodiment, the device further includes a third acquiring module 231.

The third acquiring module 231 is configured to acquire an application borne by the SCTP association to which the SCTP packet belongs, according to the application identifier corresponding to the SCTP association to which the SCTP packet belongs.

According to the embodiments of the present invention, through the foregoing technical solution, for a feature that the SCTP supports multi-homing, the SCTP tuple identification table including the mapping relation between the feature set tuple of the SCTP packet and the SCTP association is used to identify the SCTP packet. Because the SCTP feature set tuple includes the source IP address set, the destination IP address set, or the V_tag, the SCTP feature set tuple includes all interaction in one SCTP association. If the feature tuple of the SCTP packet such as the source IP address, the destination IP address, or the SCTP tag matches the feature set tuple successfully, the SCTP association to which the SCTP packet belongs can be acquired. As compared with the prior art in which all interaction in the same association cannot be completely identified when a conventional quintuple identifies an SCTP data stream, after a quintuple is used for switching in the SCTP association, the solution in this embodiment is still capable of correctly identifying an SCTP association to which a packet of the interaction belongs according to a matching result of the IP address set or the V_tag, so as to reduce missed identification. Further, the application borne by the received SCTP packet can be further acquired through a service identifier in the SCTP tuple identification table.

Figure 6:
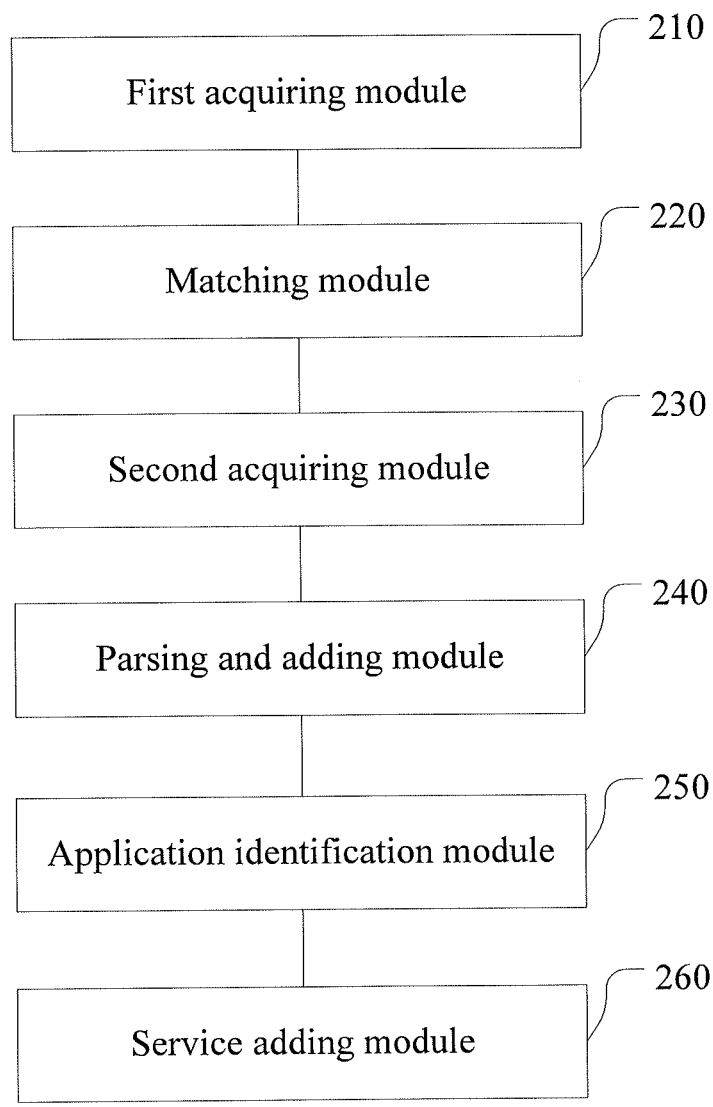
FIG. 6 is a structural view of a device for identifying an SCTP packet according to an embodiment of the present invention.

As shown in FIG. 6, in one embodiment, the device can further include a parsing and adding module 240, an application identification module 250, and a service adding module 260.

The parsing and adding module 240 is configured to parse a current SCTP handshake message to obtain new feature set tuples having an association relation if the acquired feature tuple of the SCTP packet does not match one or more records of the preset SCTP tuple identification table by the matching module 220, and add the feature set tuples into the SCTP tuple identification table as one or more new records.

The application identification module 250 is configured to identify an application type borne by an SCTP data stream to which the SCTP packet belongs, if the acquired feature tuple of the SCTP packet does not match one or more records of the preset SCTP tuple identification table by the matching module 220.

In one embodiment, the DPI technology can be used to identify the application type borne by the SCTP data stream.

The service adding module 260 is configured to label the one or more new records with an application identifier. The application identifier corresponds to the application type.

Figure 7:
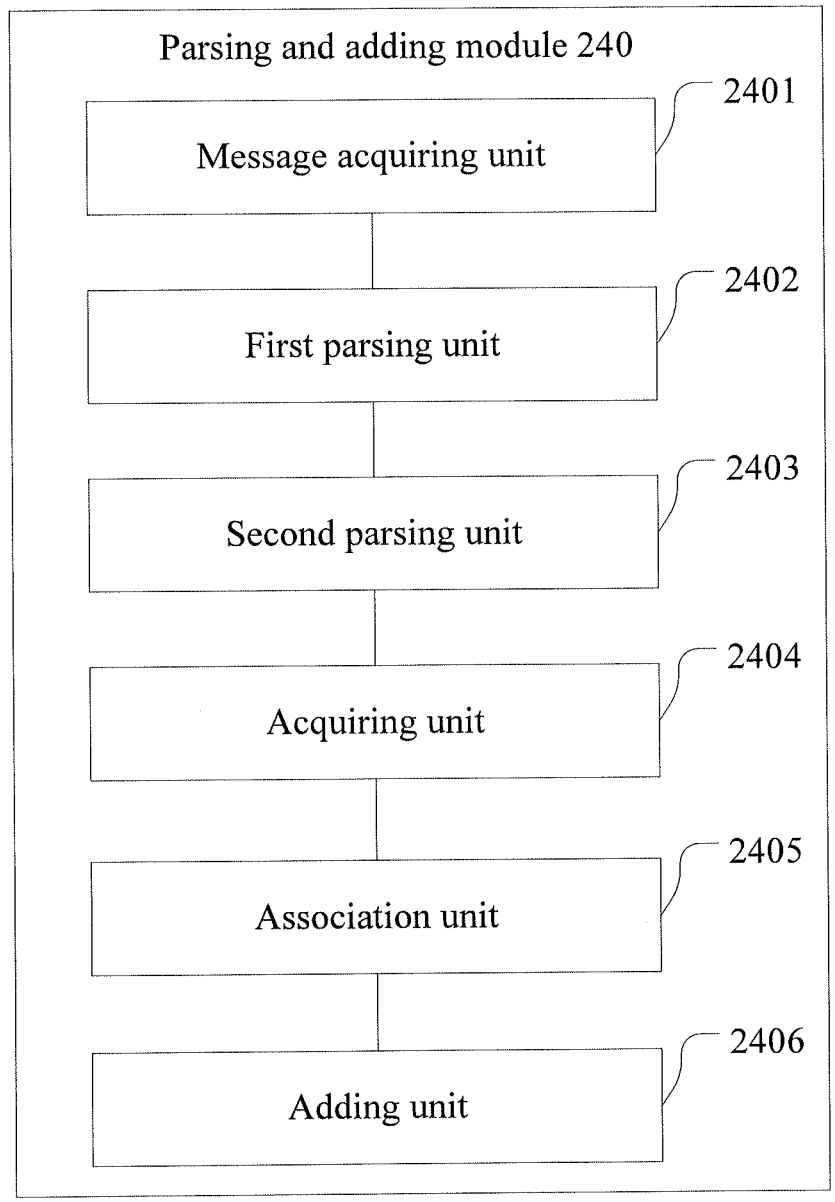
FIG. 7 is a structural view of a parsing and adding module according to an embodiment of the present invention.

As shown in FIG. 7, in one embodiment, the parsing and adding module 240 can include a message acquiring unit 2401, a first parsing unit 2402, a second parsing unit 2403, an acquiring unit 2404, an association unit 2405, and an adding unit 2406.

The message acquiring unit 2401 is configured to acquire an SCTP handshake message. The handshake message includes an INIT packet and an INIT ACK packet belonging to the same new SCTP association.

In one embodiment, the message acquiring unit 2401 can acquire the INIT ACK packet corresponding to the handshake message belonging to the same SCTP association through an IP list in the INIT packet, to obtain the SCTP handshake message.

The first parsing unit 2402 is configured to acquire a feature tuple of the INIT packet by parsing the INIT packet in the handshake message.

The second parsing unit 2403 is configured to acquire a feature tuple of the INIT ACK packet by parsing the INIT ACK packet in the handshake message.

The acquiring unit 2404 is configured to acquire a source IP address set, a destination IP address set, a source port number, a destination port number, and a V_tag of a new SCTP association that corresponds to the current SCTP handshake message, based on the feature tuples of the INIT packet and the feature tuples of the INIT ACK packet acquired by parsing.

The association unit 2405 is configured to associate source end data with destination end data acquired in the acquiring unit 2404, to obtain a record of the new SCTP association.

The adding unit 2406 is configured to add the record having an association relation into the SCTP tuple identification table.

Figure 8:
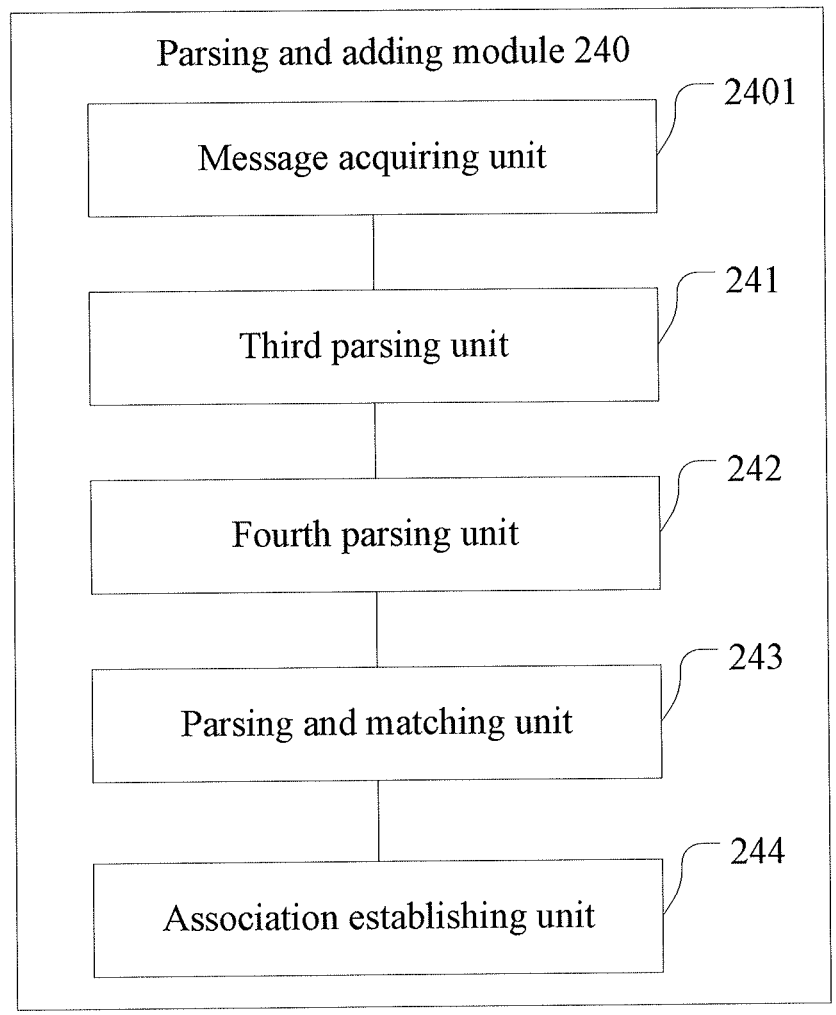
FIG. 8 is a structural view of a parsing and adding module according to an embodiment of the present invention.

As shown in FIG. 8, in another embodiment, the parsing and adding module 240 can include a message acquiring unit 2401, a third parsing unit 241, a fourth parsing unit 242, a parsing and matching unit 243, and an association establishing unit 244.

The message acquiring unit 2401 is configured to acquire an SCTP handshake message. The handshake message includes an INIT packet and an INIT ACK packet belonging to the same new SCTP association.

The third parsing unit 241 is configured to parse the INIT packet, and add information acquired by the parsing into the SCTP tuple identification table as one record. The information acquired by parsing includes at least one piece of the following information: an IP address set, a port, and a V_tag of the INIT packet.

The fourth parsing unit 242 is configured to parse the INIT ACK packet to obtain an IP address set, a port, and a V_tag of the packet.

The parsing and matching unit 243 is configured to parse a common packet header of the SCTP packet to obtain a V_tag, and match the V_tag in the common packet header with the SCTP tuple identification table. A record whose V_tag matches the V_tag in a common packet header is a record that corresponds to the INIT packet in the first parsing unit 241.

The association establishing unit 244 is configured to add the information acquired by parsing in the second parsing unit 242 to the SCTP tuple identification table as another record, and establish an association relation between the another record and the record acquired by matching in the parsing and matching unit 243.

According to the embodiments of the present invention, through the foregoing technical solution, for a feature that the SCTP supports multi-homing, the SCTP tuple identification table including the mapping relation between the feature set tuple of the SCTP packet and the SCTP association is used to identify the SCTP packet. Because the SCTP feature set tuple includes the source IP address set, the destination IP address set, or the V_tag, the SCTP feature set tuple includes all interaction in one SCTP association. If the feature tuple of the SCTP packet such as the source IP address, the destination IP address, or the SCTP tag matches the foregoing feature set tuple successfully, the SCTP association to which the SCTP packet belongs can be acquired. As compared with the prior art in which all interaction in the same association cannot be completely identified when a conventional quintuple identifies an SCTP data stream, after a quintuple is used for switching in the SCTP association, the solution in this embodiment is still capable of correctly identifying an SCTP association to which a packet of the interaction belongs according to a matching result of the IP address set or the V_tag, so as to reduce missed identification. Furthermore, a packet matched with the SCTP tuple identification table unsuccessfully is parsed, and a result acquired by parsing is updated as a record in the SCTP tuple identification table, thereby facilitating subsequent identification of a packet belonging to the same SCTP association. Further, the service identification technology identifies the application borne by the new SCTP association, thereby facilitating subsequent identification of an application borne by an SCTP packet belonging to the same SCTP association.

Figure 9:
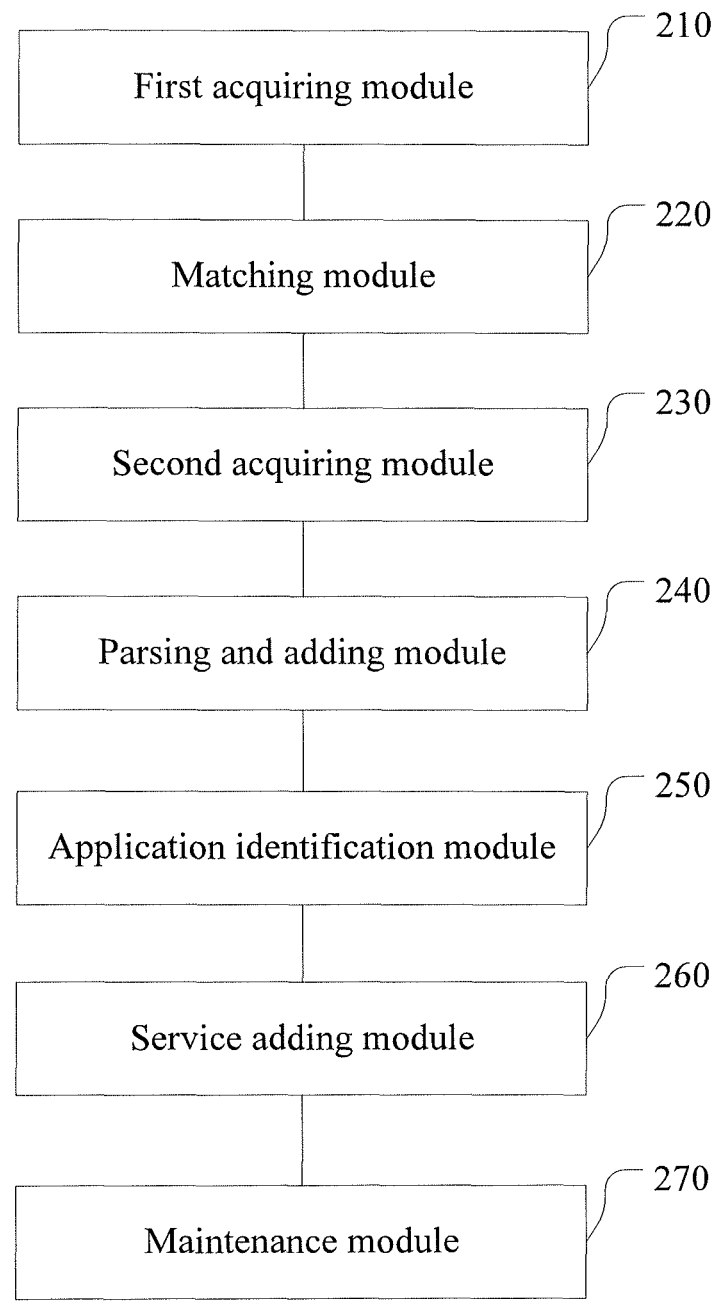
FIG. 9 is a structural view of a device for identifying an SCTP packet according to an embodiment of the present invention.

As shown in FIG. 9, in another embodiment, the device can further include a maintenance module 270.

The maintenance module 270 is configured to perform aging processing on the SCTP tuple identification table according to a preset period, and delete the record not used anymore in the SCTP tuple identification table.

Figure 10:
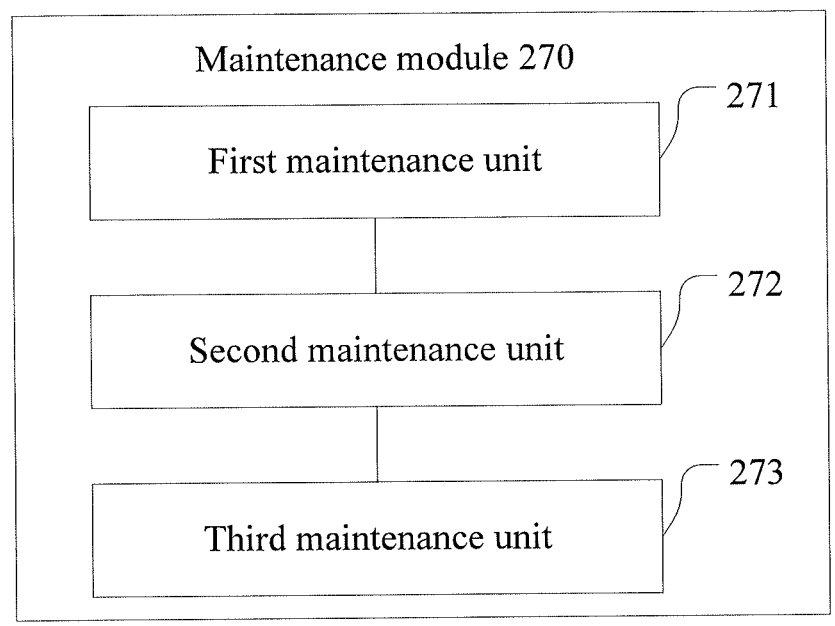
FIG. 10 is a structural view of a maintenance module according to an embodiment of the present invention.

As shown in FIG. 10, in one embodiment, the maintenance module 270 includes a first maintenance unit 271, a second maintenance unit 272, or a third maintenance unit 273.

The first maintenance unit 271 is configured to parse the received SCTP packet, and delete a corresponding record from the SCTP tuple identification table, if the received SCTP packet is an SCTP shutdown packet (such as SHUTDOWN, SHUTDOWN ACK, or ABORT).

The second maintenance unit 272 is configured to periodically check a count recording the number of times corresponding records are matched successful in the SCTP tuple identification table, and delete a record in the SCTP tuple identification table if the count of the corresponding records is not increased, that is, delete a record whose count does not increase.

The third maintenance unit 273 is configured to periodically check a timestamp recording time at which corresponding records are matched successfully in the SCTP tuple identification table, and delete a record whose timestamp exceeds a preset aging time.

According to the embodiments of the present invention, through the foregoing technical solution, for a feature that the SCTP supports multi-homing, the SCTP tuple identification table including the mapping relation between the feature set tuple of the SCTP packet and the SCTP association is used to identify the SCTP packet. Because the SCTP feature set tuple includes the source IP address set, the destination IP address set, or the V_tag, the SCTP feature set tuple includes all interaction in one SCTP association. If the feature tuple of the SCTP packet such as the source IP address, the destination IP address, or the SCTP tag matches the foregoing feature set tuple successfully, the SCTP association to which the SCTP packet belongs can be acquired. As compared with the prior art in which all interaction in the same association cannot be completely identified when a conventional quintuple identifies an SCTP data stream, after a quintuple is used for switching in the SCTP association, the solution in this embodiment is still capable of correctly identifying an SCTP association to which a packet of the interaction belongs according to a matching result of the IP address set or the V_tag, so as to reduce missed identification. Furthermore, a packet matched with the SCTP tuple identification table unsuccessfully is parsed, and a result acquired by parsing is updated as a record in the SCTP tuple identification table, thereby facilitating subsequent identification of a packet belonging to the same SCTP association. Further, the service identification technology identifies the application borne by the new SCTP association, thereby facilitating subsequent identification of an application borne by an SCTP packet belonging to the same SCTP association, and by aging maintaining the SCTP tuple identification table and timely deleting a record not used anymore in the SCTP tuple identification table, identification efficiency is increased.

Figure 11:
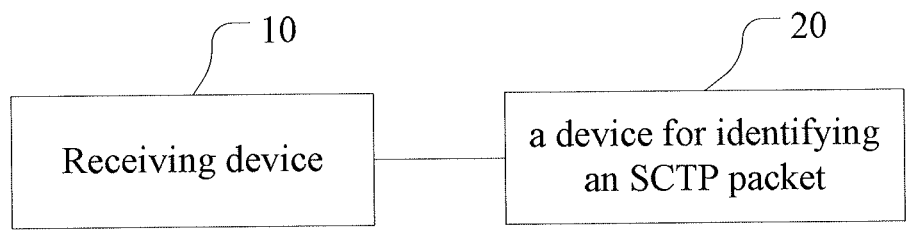
FIG. 11 is a structural view of a system for identifying an SCTP packet according to an embodiment of the present invention.

As shown in FIG. 11, an embodiment of the present invention provides a system for identifying an SCTP packet, which includes a receiving device 10 and a device for identifying an SCTP packet 20.

The receiving device 10 is configured to receive a packet.

The device for identifying an SCTP packet 20 is configured to acquire a feature tuple of a received SCTP packet when the receiving device 10 receives the SCTP packet, in which the feature tuple includes at least one piece of the following information: a source IP address, a destination IP address, and a V_tag; match the acquired feature tuple of the SCTP packet with a preset SCTP tuple identification table, in which the SCTP tuple identification table includes a mapping relation between a feature set tuple of the SCTP packet and an SCTP association, and the feature set tuple includes at least one piece of the following information: a source IP address set, a destination IP address set, and the V_tag; and acquire the SCTP association to which the SCTP packet belongs, if the acquired feature tuple of the SCTP packet matches one or more records of the preset SCTP tuple identification table.

In one embodiment, the feature tuple can further include a source port number and a destination port number. In one embodiment, the feature tuple can further include all the information of the source IP address, the destination IP address, the source port number, the destination port number, and the V_tag.

In one embodiment, the feature set tuple can further include the source port number and the destination port number. In one embodiment, the feature set tuple can further include all the information of the source IP address set, the destination IP address set, the source port number, the destination port number, and the V_tag.

A structure and functions of the device for identifying an SCTP packet 20 are as described in the device embodiment, and are not recited anymore here.

According to the embodiments of the present invention, through the foregoing technical solution, for a feature that the SCTP supports multi-homing, the SCTP tuple identification table including the mapping relation between the feature set tuple of the SCTP packet and the SCTP association is used to identify the SCTP packet. Because the SCTP feature set tuple includes the source IP address set, the destination IP address set, or the V_tag, the SCTP feature set tuple includes all interaction in one SCTP association. If the feature tuple of the SCTP packet such as the source IP address, the destination IP address, or the SCTP tag matches the foregoing feature set tuple successfully, the SCTP association to which the SCTP packet belongs can be acquired. As compared with the prior art in which all interaction in the same association cannot be completely identified when a conventional quintuple identifies an SCTP data stream, after a quintuple is used for switching in the SCTP association, the solution in this embodiment is still capable of correctly identifying an SCTP association to which a packet of the interaction belongs according to a matching result of the IP address set or the V_tag, so as to reduce missed identification.

An embodiment of the present invention also provides a method for identifying an SCTP packet, which includes the following steps:

acquiring a feature tuple of a received SCTP packet, wherein the feature tuple comprises at least one piece of the following information: a source Internet Protocol (IP) address, a destination IP address, and a verification tag (V_tag);

matching the acquired feature tuple of the SCTP packet with a SCTP tuple identification table, wherein the SCTP tuple identification table comprises: multiple records of a feature set tuple, the one or more records from the multiple records of the feature set tuple represent a first SCTP association, and the feature set tuple comprises at least one piece of the following information: a source IP address set, a destination IP address set, and a V_tag; and determining that the received SCTP packet is one of SCTP packets interacted on the first SCTP association, if the acquired feature tuple of the SCTP packet matches the one or more records which represent the first SCTP association.

In this embodiment, if the one or more records which represent the first SCTP association is labeled with an application identifier, and the application identifier is used to identify an application type borne by the first SCTP association;

the process of determining that the received SCTP packet is one of SCTP packets interacted on the first SCTP association, if the acquired feature tuple of the SCTP packet matches the one or more records which represent the first SCTP association, includes:

determining that the received SCTP packet is one of SCTP packets interacted on the first SCTP association if the acquired feature tuple of the SCTP packet matches the one or more records which represent the first SCTP association; and acquiring the application type of the received SCTP packet based on the application identifier with which the one or more records which represent the first SCTP association is labeled.

In this embodiment, the method further includes: establishing the SCTP tuple identification table, where the establishing the SCTP tuple identification table includes:

acquiring an SCTP handshake message on the first SCTP association, wherein the SCTP handshake message comprises an initialization (INIT) packet and an initialization acknowledgement (INIT ACK) packet that corresponds to the INIT packet;

parsing the INIT packet to obtain a source IP address, a destination IP address, a source port number, a destination port number, and a V_tag from a source end to a destination end of the first SCTP association;

parsing the INIT ACK packet to obtain a destination IP address, a source IP address, a source port number, a destination port number, and a V_tag from the destination end to the source end of the first SCTP association;

acquiring a feature set tuple of the first SCTP association based on information acquired by parsing the INIT packet and the INIT ACK packet, wherein the feature set tuple comprises at least one piece of the following information: a source Internet Protocol (IP) address set, a destination IP address set, a source port number, a destination port number, and a verification tag (V_tag); and adding the acquired feature set tuples into the SCTP tuple identification table as one or more records, wherein the one or more records represent the first SCTP association.

The specific details of the above process may be made reference to the descriptions in the foregoing method embodiments.

An embodiment of the present invention also provides a device for identifying an SCTP packet, which includes:

a first acquiring module, configured to acquire a feature tuple of a received SCTP packet, wherein the feature tuple comprises at least one piece of the following information: a source Internet Protocol (IP) address, a destination IP address, and a verification tag (V_tag);

a matching module, configured to match the acquired feature tuple of the SCTP packet with a SCTP tuple identification table, wherein the SCTP tuple identification table comprises: multiple records of a feature set tuple, the one or more records from the multiple records of the feature set tuple represent a first SCTP association, and the feature set tuple comprises at least one piece of the following information: a source IP address set, a destination IP address set, and a V_tag; and a second acquiring module, configured to determine that the received SCTP packet is one of SCTP packets interacted on the first SCTP association, if the acquired feature tuple of the SCTP packet matches the one or more records which represent the first SCTP association.

The specific implementations of the above functional module may be made reference to the descriptions in the foregoing method embodiments.

Persons having ordinary skill in the art may understand that all or part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be a magnetic disk, an optical disk, a read-only memory (ROM), or a random access memory (RAM).

The foregoing description is only several embodiments of the present invention, and persons skilled in the art may make various changes or transformations to the present invention according to what is published in the application document without departing from the spirit and scope of the present invention.

What is claimed is:

1. A method for identifying a Stream Control Transmission Protocol (SCTP) packet, the method comprising:
    acquiring a feature tuple of a received SCTP packet, wherein the feature tuple comprises at least one piece of the following information: a source Internet Protocol (IP) address, a destination IP address, and a verification tag (V_tag); wherein the feature tuple further comprises an association relation, wherein the association relation is used to-associate records of feature set tuples belonging to the same association;
    matching the acquired feature tuple of the SCTP packet with a SCTP tuple identification table, wherein the SCTP tuple identification table comprises a mapping relation between a feature set tuple and an SCTP association, and the feature set tuple comprises at least one piece of the following information: a source IP address set, a destination IP address set, and the V_tag; and
    acquiring the SCTP association to which the SCTP packet belongs, if the acquired feature tuple of the SCTP packet matches one or more records of the SCTP tuple identification table;
    parsing a current SCTP handshake message to obtain new feature set tuples having an association relation if the acquired feature tuple of the SCTP packet does not match one or more records of the SCTP tuple identification table, and adding the feature set tuples into the SCTP tuple identification table as one or more new records, wherein the received SCTP packet is the current SCTP handshake message;
    identifying an application type borne by the SCTP association to which the SCTP packet belongs; and
    labeling the one or more new records with an application identifier, wherein the application identifier corresponds to the application type.

2. The method according to claim 1, wherein the V_tag comprises:
    the V_tag from a source end to a destination end and/or the V_tag from a destination end to a source end.

3. The method according to claim 1, wherein the feature tuple further comprises a source port or a destination port; and the feature set tuple further comprises a source port number and a destination port number.

4. The method according to claim 1, wherein the SCTP association is identified with an association identifier or an application identifier, the association identifier is used to identify a sequence number of the SCTP association, and the application identifier is used to identify an application type borne by the SCTP association.

5. The method according to claim 1, further comprising:
    performing aging processing on the SCTP tuple identification table according to a preset period, and deleting the record not used anymore in the SCTP tuple identification table; and the performing the aging processing on the SCTP tuple identification table according to the preset period, and deleting the record not used anymore in the SCTP tuple identification table comprises:
    parsing the received SCTP packet, and deleting a record that corresponds to the SCTP packet from the SCTP tuple identification table if the received SCTP packet is an SCTP shutdown packet; or,
    periodically checking a count recording the number of times corresponding records are matched successful in the SCTP tuple identification table, and deleting a record whose count does not increase; or,
    periodically checking a timestamp recording time at which corresponding records are matched successfully in the SCTP tuple identification table, and deleting a record whose timestamp exceeds a preset aging time.

6. The method according to claim 1, wherein parsing the current SCTP handshake message to obtain the new feature set tuples having the association relation, and adding the feature set tuples into the SCTP tuple identification table as the one or more new records comprises:
    parsing an initialization (INIT) packet included in the current SCTP handshake message to obtain a feature tuple of the INIT packet;
    parsing an initialization acknowledgement (INIT ACK) packet included in the current SCTP handshake message to obtain a feature tuple of the INIT ACK packet;
    acquiring a source IP address set, a destination IP address set, a source port number, a destination port number, and a V_tag of a new SCTP association that corresponds to the current SCTP handshake message, based on the feature tuples of the INIT packet and the INIT ACK packet;

associating source end data of the new SCTP association that corresponds to the current SCTP handshake message with destination end data of the new SCTP association that corresponds to the current SCTP handshake message to obtain a record of the new SCTP association, wherein the source end data comprises: a source IP address set, a source port number, and a V_tag from a source end to a destination end of the new SCTP association that corresponds to the current SCTP handshake message; and the destination end data comprises: a destination IP address set, a destination port number, and a V_tag from a destination end to a source end of the new SCTP association that corresponds to the current SCTP handshake message; and adding the record of the new SCTP association into the SCTP tuple identification table.

7. The method according to claim 1, wherein parsing the current SCTP handshake message to obtain the new feature set tuples having the association relation, and adding the feature set tuples into the SCTP tuple identification table as the one or more new records comprises:

parsing an INIT packet included in the current SCTP handshake message, and adding information acquired by the parsing into the SCTP tuple identification table as one record, wherein the information acquired by parsing comprises at least one piece of the following information: an IP address set, a port, and a V_tag of the INIT packet;

parsing an INIT ACK packet included in the current SCTP handshake message to obtain the IP address set, the port, and the V_tag of the INIT packet;

parsing a common packet header of the SCTP packet to obtain a V_tag, and matching the V_tag in the common packet header with the SCTP tuple identification table, wherein a record whose V_tag matches the V_tag in a common packet header is a record that corresponds to the INIT packet; and adding the IP address set, the port, and the Vtag acquired by parsing the INIT ACK packet included in the current SCTP handshake message to the SCTP tuple identification table as another record, and establishing an association relation between the another record and the record that corresponds to the INIT packet.

8. A device executed by a processor for identifying a Stream Control Transmission Protocol (SCTP) packet, the device comprising:

a first acquiring hardware module, configured to acquire a feature tuple of a received SCTP packet, wherein the feature tuple comprises at least one piece of the following information: a source Internet Protocol (IP) address, a destination IP address, and a verification tag (V_tag);

a matching hardware module, configured to match the acquired feature tuple of the SCTP packet with a SCTP tuple identification table, wherein the SCTP tuple identification table comprises a mapping relation between a feature set tuple and an SCTP association, and the feature set tuple comprises at least one piece of the following information: a source IP address set, a destination IP address set, and a V_tag; and a second acquiring hardware module, configured to acquire an SCTP association to which the SCTP packet belongs, if the acquired feature tuple of the SCTP packet matches one or more records of the SCTP tuple identification table by the matching hardware module;

a parsing and adding hardware module, configured to parse a current SCTP handshake message to obtain new feature set tuples having an association relation if the acquired feature tuple of the SCTP packet does not match one or more records of the SCTP tuple identification table by the matching hardware module, and add the feature set tuples into the SCTP tuple identification table as one or more new records, wherein the received SCTP packet is the current SCTP handshake message;

an application identification hardware module, configured to identify an application type borne by the SCTP association to which the SCTP packet belongs; and a service adding hardware module, configured to label the one or more new records with an application identifier, wherein the application identifier corresponds to the application type.

9. The device according to claim 8, wherein the parsing and adding hardware module comprises:

a first parsing hardware unit, configured to parse an initialization (INIT) packet included in the current SCTP handshake message to obtain a feature tuple of the INIT packet;

a second parsing hardware unit, configured to parse an initialization acknowledgement (INIT ACK) packet included in the current SCTP handshake message to obtain a feature tuple of the INIT ACK packet;

an acquiring hardware unit, configured to acquire a source IP address set, a destination IP address set, a source port number, a destination port number, and a V_tag of a new SCTP association that corresponds to the current SCTP handshake message, based on the feature tuples of the INIT packet and the INIT ACK packet;

an association hardware unit, configured to associate source end data of the new SCTP association that corresponds to the current SCTP handshake message with destination end data of the new SCTP association that corresponds to the current SCTP handshake message to obtain a record of the new SCTP association, wherein the source end data comprises: a source IP address set, a source port number, and a V_tag from a source end to a destination end of the new SCTP association that corresponds to the current SCTP handshake message; and the destination end data comprises: a destination IP address set, a destination port number, and a V_tag from a destination end to a source end of the new SCTP association that corresponds to the current SCTP handshake message; and an adding hardware unit, configured to add the record of the new SCTP association into the SCTP tuple identification table.

10. The device according to claim 8, wherein the parsing and adding hardware module comprises:

a third parsing hardware unit, configured to parse an INIT packet included in the current SCTP handshake message, and add information acquired by the parsing into the SCTP tuple identification table as one record, wherein the information acquired by parsing comprises at least one piece of the following information: an IP address set, a port, and a Vtag of the INIT packet;

a fourth parsing hardware unit, configured to parse an INIT ACK packet included in the current SCTP handshake message to obtain the IP address set, the port, and the Vtag of the INIT packet;

a parsing and matching hardware unit, configured to parse a common packet header of the SCTP packet to obtain a V_tag, and match the V_tag in the common packet header with the SCTP tuple identification table, wherein a record whose V_tag matches the V_tag in a common packet header is a record that corresponds to the INIT packet; and an association establishing hardware unit, configured to add the IP address set, the port, and the V_tag acquired by parsing the INIT ACK packet included in the current SCTP handshake message to the SCTP tuple identification table as another record, and establish an association relation between the another record and the record that corresponds to the INIT packet.

11. The device according to claim 8, further comprising:

a maintenance hardware module, configured to perform aging processing on the SCTP tuple identification table according to a preset period, and delete the record not used anymore in the SCTP tuple identification table, and the maintenance hardware module comprises a first maintenance unit, a second maintenance unit, or a third maintenance unit; wherein the first maintenance hardware unit is configured to parse the received SCTP packet, and delete a record that corresponds to the SCTP packet from the SCTP tuple identification table, if the received SCTP packet is an SCTP shutdown packet;

the second maintenance hardware unit is configured to periodically check a count recording the number of times corresponding records are matched successful in the SCTP tuple identification table, and delete a record whose count does not increase; and the third maintenance hardware unit is configured to periodically check a timestamp recording time at which corresponding records are matched successfully in the SCTP tuple identification table, and delete a record whose timestamp exceeds a preset aging time.

12. The method according to claim 1, wherein the acquired feature tuple is used as a key value and matches the SCTP tuple identification table with a hash lookup method.

* * * * *